Patented Aug. 29, 1950

2,520,671

UNITED STATES PATENT OFFICE 2,520,671

POLYHYDROXY COMPOUNDS

Harold Wittcoff and John Robert Roach, Minneapolis, Minn., assignors to General Mills, Inc., a corporation of Delaware No Drawing. Application October 24, 1946, Serial No. 705,491

7 Claims. (Cl. 260—615)

The present invention relates to polyhydroxy compounds resulting from the condensation of a monofunctional alkylating agent containing two or more hydroxyl groups with polyhydroxy compounds containing at least four hydroxyl groups, and to the method of producing these polyhydroxy compounds.

For many purposes polyhydric alcohols having a high degree of functionality are desirable; for example, in the protective coating field, polyhydric alcohols esterified with unsaturated fatty acid groups are used in coatings because of their drying characteristics. The rate of drying of these compounds is dependent upon the degree of unsaturation and consequently upon the number of unsaturated fatty acid groups in the molecule. Accordingly, there have been attempts to produce polyhydric alcohols of increased functionality, such that they may be used for esterification with unsaturated fatty acids to produce drying compositions. Thus synthetic compounds such as pentaerythritol, 2,2,6,6-tetramethylolcyclohexanol, 3,3,5,5 - tetramethylolpyran - 4 - ol, which result from the condensation of carbonyl containing compounds with formaldehyde have been made containing four to five hydroxyl groups per molecule. Other attempts to make use of polyhydric alcohols have involved the use of sugars and sugar alcohols. These, however, have not proved satisfactory because they exhibit heat instability during subsequent esterification.

By the present invention it has been found possible to produce polyhydric alcohols containing a substantial number of hydroxyl groups, which compounds can be prepared with ease in good yields, and which compounds possess desirable characteristics.

It is, therefore, an object of the present invention to provide novel polyhydroxy compounds produced by the condensation of a monofunctional alkylating agent containing at least two hydroxyl groups with a polyhydroxy compound containing at least four hydroxyl groups.

It is another object of the present invention to provide a process of producing the above polyhydroxy compounds.

In general, the invention involves the condensation of a monofunctional alkylating agent containing at least two free or potential hydroxyl groups with a polyhydroxy compound containing at least four hydroxyl groups. For example, pentaerythritol may be condensed with glycerol monochlorohydrin to produce a polyhydric alcohol of high functionality. By controlling the relative proportions of reactants, the polyhydric alcohol thus produced may condense with further monochlorhydrin to produce higher functional alcohols. In this way, it is possible to build up molecules of appreciable size possessing a substantial number of hydroxyl groups.

The polyhydroxy compound employed is subject to considerable variation. Suitable polyhydroxy compounds having at least four hydroxyl groups include diglycerol, triglycerol, higher polyglycerols; polyallyl alcohol, polyvinyl alcohol, polymethallyl alcohol; pentaerythritol, dipentaerythritol, higher polypentaerythritols, 2,2,6,6-tetramethylolcyclohexanol, 3,3,5,5-tetramethylolpyran-4-ol, 3,3,5-trimethylol-5-methylpyran-4-ol, and other polyhydroxy compounds resulting from the condensation of ketones or aldehydes with formaldehyde; erythritol, xylitol, xylose, sorbitol, mannital, glucose, sucrose, and the like, as well as any ester or ether, amide or other derivative of the above type of compounds which is stable under the conditions of the reactions, and which contains at least four hydroxyl groups.

The monofunctional derivative employed may contain a plurality of free hydroxyl groups, or the hydroxyl groups may be potential as in the case of an epoxide, and the term "monofunctional alkylating agent having at least two hydroxyl groups" is intended to include such compounds which contain potential hydroxyl groups. Suitable monofunctional reagents include the glycerol-alpha-monohalohydrins (chloro, bromo, and iodo), as well as similar monohalohydrins of diglycerol, triglycerol, and higher polyglycerols such as the halohydrins of polyglycerols resulting from the addition of hypochlorous acid to monoallylglycerol, monoallyldiglycerol, as disclosed in our co-pending application, Serial No. 705,485, now Patent No. 2,520,671, entitled Halohydroxypropyl Ethers, filed of even date herewith. Other suitable monofunctional reagents include glycidol, glycerolglycidol, diglycerolglycidol, pentaerythritol monohalohydrin, 2,2,6,6-tetramethylolcyclohexyl chloride or any isomer thereof, 3,3,5,5-tetramethylol-4-chloropyran or any isomer thereof, any glycosyl halide or similar sugar halide or halide derivative, and the like.

The condensation involved is simple and proceeds readily. Any conventional etherifying procedure may be used. Where halogenated hydroxy compounds are employed as the alkylating agent, it has been found desirable, however, to employ as the condensing medium a solution of concentrated caustic alkali, such as 50% sodium hydroxide solution, although less concentrated alkali may also be employed. The polyhydric alcohols may be mixed with the requisite amount of the caustic alkali solution, usually a 0.1 molar excess based on the amount of the monofunctional reagent. Thereafter, the monofunctional reagent may be added all at once or slowly over a period of several hours with agitation and heating. Thereafter the precipitated inorganic material is removed by filtration and the filtrate is neutralized and concentrated under reduced pressure. From the residue, the desired product may be obtained by extracting with an alcoholic solvent such as methanol, ethanol propanol, isopropanol, etc.

In the case where epoxides are used as the monofunctional alkylating reagent, the reaction proceeds much more rapidly and it is usually desirable to use only a catalytic amount of either caustic alkali, acid or acid salt as the condensing agent. Likewise it may be advisable to cool the reaction mixture. In other instances where halogen compounds are used which are less reactive than the epoxides, it may be advisable to employ more severe reaction conditions such as those obtainable with an autoclave.

A great amount of variation is possible so far as time and temperature are concerned. Thus the reaction time may extend from one to twelve or more hours, whereas the temperature may vary from room temperature in the case of epoxides to 150° C. or more in the case of halides. It has been found that good results may usually be obtained with the halogen compounds by employing a temperature of 50–100° C. for four to eight hours.

The products which result possess properties which render them useful for numerous applications. They have been found to be valuable in the preparation of protective coating intermediates. Thus esterification with drying or semi-drying oil acids yields valuable reconstituted oils. Esterification with rosin, hydrogenated rosin, limed or zincated rosin, disproportionated rosin, rosin-maleic anhydride adduct, Manila copal, or any similar resin or resin derivative yields valuable materials for use in varnish manufacture. These polyhydric alcohols of the present invention may likewise be used in the preparation of modified alkyd resins.

The products of the present invention may likewise be esterified with short chain acids such as acetic, propionic, glycollic, lactic, butyric, and the like, to produce plasticizers or they may be esterified with long chain saturated acids such as stearic and the like to produce waxes. By partial esterification with long chain acids, it is possible to produce emulsifying agents. In addition, the products may be etherified, for example to give useful allyl, substituted allyl, or vinyl ethers.

The polyhydroxy compounds themselves are useful as humectants in products which require the maintenance of a given moisture level and freshness. The polyhydric alcohols may also be used to plasticize glue or gelatin for all purposes where a flexible glue or protein composition or film is required. Other uses include use in rubber stamp inks, copying inks, and shoe polishes, where the polyhydric alcohols prevent excessive drying and serve as a solvent for the dye or coloring matter. They are also useful in dyeing and printing textiles as they improve the penetrating power of the dye. They are also useful in soap production.

*Example 1*

A mixture of commercial pentaerythritol (109 parts, combining weight, 36.2) and aqueous sodium hydroxide (50%, 144 parts), was heated to 90° C. after which glycerol-alpha-monochlorohydrin (167 parts) was added with stirring over a period of three hours. The reaction mixture was then heated and stirred at 90° C. for three and one-half hours more. Thereafter, 50 parts of acetone were added and the reaction mixture was neutralized with dilute hydrochloric acid. The precipitated sodium chloride was removed by filtration and the filtrate was concentrated at reduced pressure. The resulting material was extracted several times with absolute ethyl alcohol and the solvent was removed to obtain a syrup with a hydroxyl content of 37.7%.

*Example 2*

The procedure of Example 1 was followed using 136 parts of pure pentaerythritol, 352 parts of 50% aqueous sodium hydroxide and 442 parts of glycerol-alpha-monochlorohydrin. The addition was accomplished at 100° C. over a period of four hours after which the reaction mixture was heated and stirred at 100° C. for two hours longer. The product was worked up as indicated previously to obtain a syrup with a hydroxyl content of 31.9%.

*Example 3*

In an appropriate vessel were placed 288 parts of methyl ethyl ketone, 780 parts of formaldehyde as paraformaldehyde and 3,000 parts of water. There was added slowly with stirring 112 parts of calcium oxide whereupon the temperature rose spontaneously to 50° C. Thereafter, cooling was employed so that the temperature would not rise higher and once the initial exothermic reaction had subsided, the reaction mixture was heated and stirred at 50°–55° C. for two hours. The cooled solution was treated with 90% of the requisite amount of dilute sulfuric acid or until Congo Red paper indicated a slightly acidic reaction. Thereafter, the reaction mixture was made strongly acid to Congo Red paper with oxalic acid solution. The easily filtrable precipitate of calcium oxalate and calcium sulfate was removed, whereupon the aqueous solution was stirred for several hours with 2,000 parts of a basic ion exchange resin such as Amberlite IR–4. The pH of the solution, accordingly, was raised to between 5 and 6 which is sufficiently low acidity to yield an excellent product. The resin is then removed by filtration. After the treatment with the resin, it may be necessary to treat the solution with charcoal in order to remove color imparted by the resin. Thereafter, the solution is desolvated in vacuo to yield an almost colorless sirup whose hydroxyl content was of the order of 30%. A mixture of 100 parts of this condensation product and 117 parts of 50% aqueous sodium hydroxide was treated over a period of one hour with 147 parts of glycerol-alpha-monochlorohydrin at 100° C. The reaction mixture, thereafter, was stirred and heated for five hours more. The product was isolated as described in the previous examples and possessed a hydroxyl content of 27.0%.

In those cases in which the polyhydric alcohol employed is obtained by condensation of a carbonyl-containing compound such as acetone or acetaldehyde with formaldehyde, it is not necessary to isolate the resulting alcohol. It is readily possible to effect the formaldehyde condensation in the usual basic medium after which solid alkali may be added to the aqueous reaction mixture and the condensation with the alkylating agent may then be effected.

While various modifications of the invention have been described, it is understood that the invention is not limited thereto, but may be varied within the scope of the following claims.

We claim as our invention:

1. Process of producing a polyhydric alcohol from a product resulting from the condensation of a carbonyl-containing compound and formaldehyde under aqueous alkaline conditions, which comprises adding to the crude reaction mixture containing the condensation product and the alkaline catalyst, caustic alkali and a monofunctional alkylating agent containing at least two hydroxyl groups, and allowing the reaction to proceed to etherify hydroxyl groups of said condensation product with said monofunctional alkylating agent.

2. Process of producing a polyhydric alcohol from a product resulting from the condensation of a carbonyl-containing compound and formaldehyde under aqueous alkaline conditions, which comprises adding to the crude reaction mixture containing the condensation product and the alkaline catalyst, caustic alkali and a monofunctional alkylating agent comprising an epoxide containing at least one free hydroxyl group, and allowing the reaction to proceed at a temperature within the approximate range of from room temperature to 150° C. to etherify hydroxyl groups of said condensation product with said epoxide.

3. Process of producing a polyhydric alcohol from a product resulting from the condensation of a carbonyl-containing compound and formaldehyde under aqueous alkaline conditions, which comprises adding to the crude reaction mixture containing the condensation product and the alkaline catalyst, caustic alkali and a monohalohydrin containing at least two hydroxyl groups, and allowing the reaction to proceed at a temperature within the approximate range of 50–150° C. for a period of from four to eight hours to etherify hydroxyl groups of said condensation product with said monohalohydrin.

4. Process of producing a polyhydric alcohol from a product resulting from the condensation of a carbonyl-containing compound and formaldehyde under aqueous alkaline conditions, which comprises adding to the crude reaction mixture containing the condensation product and the alkaline catalyst, caustic alkali and a monohalohydrin containing at least two hydroxyl groups, and allowing the reaction to proceed at a temperature within the approximate range of 50–100° C. for a period of from four to eight hours to etherify hydroxyl groups of said condensation product with said monohalohydrin.

5. Process of producing a polyhydric alcohol which comprises adding caustic alkali and a monofunctional alkylating agent containing at least two hydroxyl groups to a crude reaction mixture containing pentaerythritol resulting from the condensation of acetaldehyde and formaldehyde in the presence of an aqueous alkaline medium, and allowing the reaction to proceed to etherify hydroxyl groups of the pentaerythritol with said monofunctional alkylating agent.

6. Process of producing a highly functional polyhydric alcohol from the crude reaction mixture containing pentaerythritol resulting from the condensation of acetaldehyde and formaldehyde in the presence of aqueous medium, said reaction mixture constituting a relatively dilute aqueous solution of pentaerythritol, which comprises adding to the crude reaction mixture glycerol monochlorohydrin and solid caustic alkali at least in an amount equivalent to the glycerol monochlorohydrin, heating the reaction mixture at a temperature within the approximate range of 50–100° C. for a period of from four to eight hours, neutralizing the reaction mixture, concentrating the neutralized reaction mixture, and thereafter extracting the highly functional polyhydric alcohol from the concentrated reaction mixture by means of an organic solvent.

7. Process of producing a highly functional polyhydric alcohol which comprises condensing an aliphatic ketone having active hydrogens adjacent the carbonyl group, with formaldehyde in the presence of water, the formaldehyde being in a quantity at least one mole for each mole of active hydrogen in the aliphatic ketone, in the presence of calcium oxide catalyst, allowing the reaction to proceed at a temperature of from 50–55° C. for a period of about two hours, adding glycerol monochlorohydrin and solid sodium hydroxide in an amount at least equivalent to the glycerol monochlorohydrin to the reaction mixture, maintaining this reaction mixture at a temperature of 50–100° C. for a period of from four to eight hours, neutralizing the sodium hydroxide and recovering the resultant etherified polyhydroxy condensation product.

HAROLD WITTCOFF.
JOHN ROBERT ROACH.

REFERENCES CITED

The following references are of record in the file of this patent:

UNITED STATES PATENTS

| Number | Name | Date |
|---|---|---|
| 969,159 | Fleming | Sept. 6, 1910 |
| 2,258,892 | Harris | Oct. 14, 1941 |
| 2,380,185 | Marple | July 10, 1945 |
| 2,441,944 | Remensnyder | May 18, 1948 |

FOREIGN PATENTS

| Number | Country | Date |
|---|---|---|
| 317,770 | Great Britain | Aug. 19, 1929 |